Oct. 31, 1972     B. PHILLIPS     3,701,574

BEARING STRUCTURE

Filed Aug. 10, 1971

INVENTOR.
BENJAMIN PHILLIPS
BY
Barnes, Kisselle, Raisch & Choate
ATTORNEYS ns Patent Office 3,701,574
Patented Oct. 31, 1972

3,701,574
BEARING STRUCTURE
Benjamin Phillips, Owosso, Mich., assignor to Universal
Electric Company, Owosso, Mich.
Filed Aug. 10, 1971, Ser. No. 170,441
Int. Cl. F16c 23/04
U.S. Cl. 308—72                                                    12 Claims

ABSTRACT OF THE DISCLOSURE

An electric motor comprises a motor housing, a stator and a rotor. The housing has an end wall with an opening therein and slots extending radially outwardly from the opening to define a plurality of cantilever mounted segments. Each segment has a first portion extending generally radially and a second portion forming a free end extending generally axially so that the segment is yieldable axially. The ends of the segments define a cylindrical supporting surface that engages a spherical contacting surface of a bearing member which has a bore therein for receiving the shaft of the rotor. Alternate segments have their free ends extending generally axially in opposite directions from adjacent segments.

This invention relates to bearing structures and particularly to bearing structures for electric motors.

BACKGROUND OF THE INVENTION

An important problem with respect to construction of electric motors is that of providing self-aligning bearing structures which will accommodate for variations due to manufacturing tolerances and at the same time maintain the proper air gap between the rotor and stator. Two types of bearing structures have been used for such purposes. One common type utilizes a spherical bearing that is held in place by a spring which can be either of the coil or flat type. These types of springs tend to exert uneven forces around the circumferential contacting surfaces with the bearing. Such construction has several important disadvantages. First, such a construction requires a precise matching seat. Second, such a construction tends to pull out of the matching seat when a radial load is applied. If the spring force is made large enough to withstand a large radial load, misalignment of the bearing to the shaft will result in increasing the bearing friction and causing a resulting higher power consumption and starting difficulties. Also, because coil springs do not exert equal ciricumferential pressure, a misalignment is created between the shaft and bearing. Also, when a bearing is supported at one end by a spherical bearing and matching seal, a radial load on the shaft causes binding between the spherical bearing and the shaft.

More successful types of self-aligning bearings are shown in the ptaents to Hoddy et al. 3,063,761, 3,223,464, 3,273,947 and 3,273,948 and comprise a supporting surface on the motor housing and a contacting surface on a bearing member that supports the shaft. One of these surfaces is resiliently mounted. In addition, one of these surfaces is cylindrical and the other is spherical.

An improved bearing construction is disclosed and claimed in the U.S. patent to George W. Hoddy 3,529,784, issued Sept. 22, 1970, which comprises an electric motor wherein the end wall of the housign has slots extending radially outwardly from the opening to define a plurality of cantilever mounted segments. Each segment has a first portion extending generally radially and a second portion forming a free end extending generally axially so that the segment is yieldable axially. In one form, the ends of the segments define a cylindrical supporting surface that engages a spherical contacting surface of a bearing member which has a bore therein for receiving the shaft of the rotor. In another form, the ends of the segments define a spherical supporting surface that engages a cylindrical contacting surface on a bearing member.

Among the objects of the present invention are to provide a bearing structure of the types shown in the Hoddy patent which is improved, eliminates axial load on the housing, has longer life, utilizes a minimum number of parts, is lower in cost, does not need critical dimensional tolerances, will withstand larger radial loads, and, in addition, has a low noise level.

In accordance with the invention, the electric motor comprises a motor housing, a stator and a rotor. The housing has an end wall with an opening therein and slots extending radially outwardly from the opening to define a plurality of cantilever mounted segments. Each segment has a first portion forming a free end extending generally axially so that the segment is yieldable axially. The ends of the segments define a cylindrical supporting surface that engages a spherical contacting surface of a bearing member which has a bore therein for receiving the shaft of the rotor. At least some of the segments have their free ends extending generally axially in opposite directions from adjacent segments.

DESCRIPTION

Figure 1:
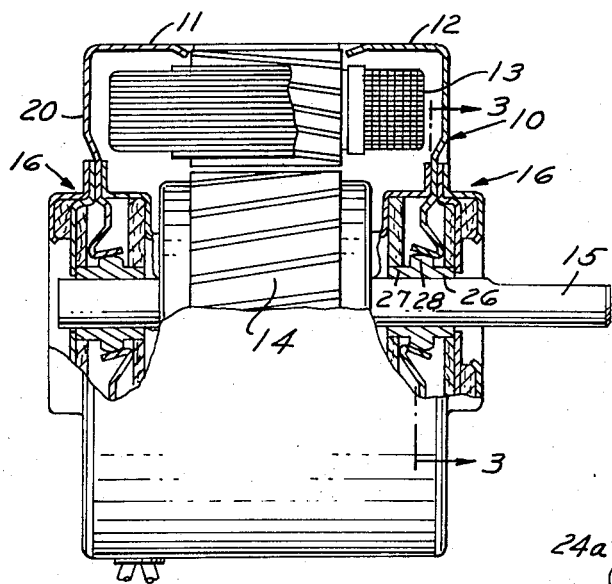
FIG. 1 is a part sectional longitudinal view of an electric motor embodying the invention.
Figure 6:
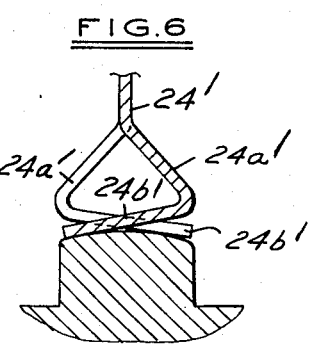
FIG. 6 is a fragmentary sectional view on an enlarged scale similar to FIG. 4 of a modified form of the invention.
Figure 2:
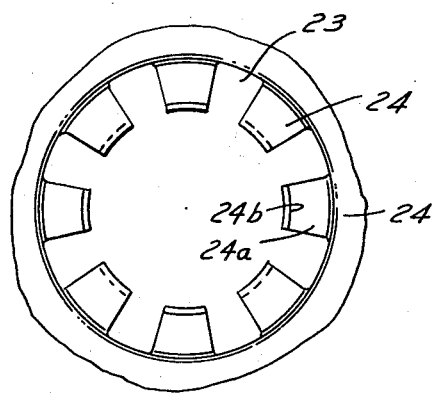
FIG. 2 is a fragmentary end view on an enlarged scale, parts being broken away.
Figure 3:
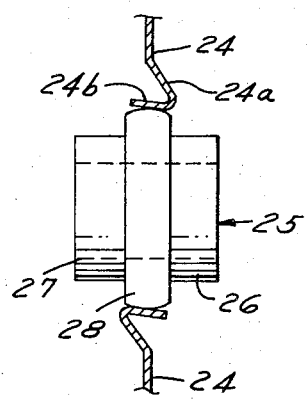
FIG. 3 is a fragmentary sectional view taken along the line 3—3 in FIG. 1.
Figure 4:
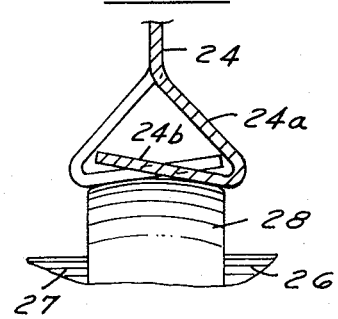
FIG. 4 is a fragmentary sectional view on an enlarged scale of a portion of the structure shown in FIG. 3.

Referring to FIGS. 1 and 2, the invention relates to an electric motor which comprises a motor housing 10 of sheet metal or the like which may be made of two sections 11, 12 joined together, a stator 13 fixed in housing 10 and rotor 14 mounted on a shaft 15. A bearing assembly 16 is provided at each end of the housing for rotatably supporting shaft 15.

As shown in FIGS. 1 and 2, each bearing assembly 16 comprises a wall 20 forming an integral end of each section 11, 12 of the housing 10. The wall 20 has an opening therein and circumferentially spaced slots 23 extending radially to define cantilever segments 24. The free ends of the segments 24 are bent and extend axially as shown in FIG. 1 such that each segment includes a first generally radial portion 24a joined to the wall 20 and a second generally axial portion 24b extending axially and comprising the free end of each segment. The wall 20 is made of metal such that each segment 24 which is cantilever mounted has limited axial movement, as presently described.

The bearing structure further includes a bearing member 25 that comprises a sleeve 26 having an axial bore 27 for receiving the shaft 15 and an annular projection 28 that is curved transversely of the bearing member in a direction longitudinally of the bore 27 and preferably centered longitudinally of the bearing member. The center of the spherical contacting surface on the periphery of the projection 28 is aligned substantially on the axis of the bore 27, and in turn, the cylindrical supporting surface defined by the inner surface of the portion 24b of the segments 24. The cylindrical supporting surface defined by the portions 24b of the segments 24 has a longitudinal extent sufficient to permit relatively unrestrained axial movement of the bearing member relative to the supporting surface. At least some, and preferably alternate segments 24 have their second portions 24b extending generally axially in directions opposite to those of the adjacent segments 24. An even number of segments is preferred.

In assembling the bearing, the bearing member 25 is forced axially to snap in position with the portions 24b applying opposing axial and radial forces to maintain the bearing member 25 in position.

In use, no external force is required to retain the bearing in position or in its seat because the support defined by the segments has its center at the center of the spherical surface on the bearing member. The force imposed by loads on the shaft 15 is thus directly statically balanced by the reaction of the support and it is impossible for the imposed radial load to pull the bearing from its seat.

Figure 5:
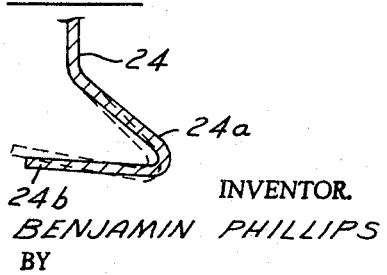
FIG. 5 is a partly diagrammatic view showing the manner in which the bearing structure is operable to produce the desired result.

The manner in which the bearing functions can be more readily understood by reference to the diagram shown in FIG. 5. When the bearing member 25 is inserted in position, the segments 24 are displaced by an angle shown in exaggerated relation in FIG. 5. This is because the outer diameter of the projection 28 is slightly greater than the untensioned diameter of the cylindrical supporting surface defined by the portions 24b of the segments 24. This difference may be on the order of approximately three to six thousandths of an inch but is not necessarily limited to this amount.

The reaction force on each segment of the bearing during this press fit is further shown in FIG. 5 and comprises a force extending along the axis of the portion 24b. This force can be resolved into two components transversely and axially. The transverse or radial component of the force always tends to retain the bearing within the support.

In the modified form of the invention, the segments 24' comprise a generally radial portion 24a' and a generally axial portion 24b' and the angle between these portions is an obtuse angle rather than an acute angle as in the previous form of the invention.

It has been found that the bearing embodying the invention is extremely rugged. Moreover, it can be used with reciprocating pump and similar loads because there are no springs or similar elastic members to fail under stress. Critical dimensional tolerances are not needed since the cantilever segments will accommodate for any minor deviations in tolerances. It has been further found that the bearing structure will withstand large radial and thrust loads and has a low noise level and long life.

As disclosed in the aforementioned Hoddy Pat. 3,529,784, the portions 24b may be curved to define a spherical contacting surface which engages a cylindrical contacting surface on the bearing member 25.

Although the invention has been described as being applied to an electric motor, it can be utilized in other devices wherein accurate positioning of a rotating shaft is desired.

I claim:
1. A self-aligning bearing structure for a shaft comprising
a bearing member having a bore for receiving a shaft,
means comprising a plurality of circumferentially spaced cantilever supported segments circumscribing an annular supporting surface,
each said segment comprising a base on the housing, a first portion extending generally radially from said base and a second portion extending generally axially and defining a free end,
each said segment being axially yieldable,
said bearing member having an outer perimeter defining a contacting surface portion,
one of said annular supporting surface and said contacting surface portion of said bearing member having a curved configuration transversely in a direction along the axis of said bore and the other of said annular supporting surface and contacting surface portion being substantially cylindrical longitudinally of the bore,
at least some of said segments having said second portions thereof extending generally axially in the opposite direction from the second portions of the remainder of said segments.

2. The combination set forth in claim 1 wherein alternate segments have said second portions thereof extending generally axially in an opposite direction to that of said second portions of circumferentially adjacent segments.

3. The combination set forth in claim 1 wherein the diameter of said annular supporting surface is less than the corresponding diameter of said contacting surface portion.

4. The combination set forth in claim 1 wherein said cylindrical surface comprises the annular surface circumscribed by said segments and said curved surface comprises the outer periphery of said bearing member.

5. The combination set forth in claim 5 wherein said second portions of said segments extend such that the free ends thereof extend radially inwardly.

6. The combination set forth in claim 1 wherein said wall and said segments are made of sheet metal.

7. The combination comprising
a motor housing or the like having spaced end walls,
said motor housing having a portion of each end wall thereof formed with an opening therein,
each said wall having a plurality of radially extending slots defining segments,
said segments having their free ends bent with relation to the portions thereof which are joined to the end wall so that a first portion of each segment adjacent the end wall extends generally radially and a second portion at the free end extends generally axially inwardly of the motor housing,
said second portions defining an annular supporting surface,
each said segment being radially and axially yieldable,
a bearing member for each end of said housing,
each said bearing member having a bore for receiving a shaft,
each said bearing member having an outer perimeter defining a contacting surface portion,
one of said annular supporting surface and said contacting surface portion of said bearing member having a spherical configuration transversely in a direction along the axis of said bore and the other of said annular contacting surface and contacting surface portion being cylindrical,
at least some of said segments having said second portions thereof extending generally axially in the opposite direction from the second portions of the remainder of said segments.

8. The combination set forth in claim 7 wherein alternate segments have said second portions thereof extending generally axially in an opposite direction to that of said second portions of circumferentially adjacent segments.

9. The combination set forth in claim 7 wherein the diameter of said annular supporting surface is less than the corresponding diameter of said contacting surface portion.

10. The combination set forth in claim 7 wherein said cylindrical surface comprises the annular surface circumscribed by said segments of said extension and said curved surface comprises the outer surface of said bearing member.

11. The combination set forth in claim 10 wherein said second portions of said segments extend such that the free ends thereof extend radially inwardly.

12. The combination set forth in claim 7 wherein said wall and said segments are made of sheet metal.

References Cited
UNITED STATES PATENTS 3,529,874   9/1970   Hoddy _____ 708—72

MARTIN P. SCHWADRON, Primary Examiner

F. SUSKO, Assistant Examiner